US012406779B2

(12) United States Patent
Maleika et al.

(10) Patent No.: US 12,406,779 B2
(45) Date of Patent: Sep. 2, 2025

(54) INSULATING SYSTEM COMPRISING A SOLID INSULATING MATERIAL AND IMPREGNATING RESIN

(71) Applicant: Siemens Mobility GmbH, Munich (DE)

(72) Inventors: Marek Maleika, Fürth (DE); Steffen Lang, Hallerndorf (DE); Florian Schemmel, Nuremberg (DE); Niels Müller, Georgensgmünd (DE)

(73) Assignee: SIEMENS MOBILITY GMBH, Munich (DE)

( * ) Notice: Subject to any disclaimer, the term of this patent is extended or adjusted under 35 U.S.C. 154(b) by 73 days.

(21) Appl. No.: 18/547,263

(22) PCT Filed: Feb. 15, 2022

(86) PCT No.: PCT/EP2022/053682
§ 371 (c)(1),
(2) Date: Aug. 21, 2023

(87) PCT Pub. No.: WO2022/175268
PCT Pub. Date: Aug. 25, 2022

(65) Prior Publication Data

US 2024/0153668 A1 May 9, 2024

(30) Foreign Application Priority Data

Feb. 22, 2021 (EP) .................................... 21158485

(51) Int. Cl.
*H01B 3/46* (2006.01)

(52) U.S. Cl.
CPC ...................................... *H01B 3/46* (2013.01)

(58) Field of Classification Search
CPC .......... H01B 3/306; H01B 3/307; H01B 3/40; H01B 3/427; H01B 3/46
(Continued)

(56) References Cited

U.S. PATENT DOCUMENTS 4,622,739 A * 11/1986 Pejouhy .................. H01H 9/04 29/622
5,660,932 A 8/1997 Durston ........................ 428/373
(Continued)

FOREIGN PATENT DOCUMENTS

CN 1123582 A 5/1996 ............ B32B 27/36
CN 105473309 A 4/2016 ............ B29C 55/00
(Continued)

OTHER PUBLICATIONS

High-Temp Engineering Thermoplastics_Satri_pp. 173-213_2013.*
(Continued)

*Primary Examiner* — Timothy J Thompson
*Assistant Examiner* — Guillermo J Egoavil
(74) *Attorney, Agent, or Firm* — Slayden Grubert Beard PLLC

(57) ABSTRACT

Various embodiments of the teachings herein include an insulation system. The system may include a solid insulation material including a two-dimensional insulant and a synthetic resin. The two-dimensional insulant includes a blend of a copolymer with a high-temperature thermoplastic. The synthetic resin includes a thermoset to impregnate the two-dimensional insulant and then cure the two-dimensional insulant.

10 Claims, 2 Drawing Sheets

(58) Field of Classification Search
USPC ........................................................ 174/138 C
See application file for complete search history.

(56) References Cited

U.S. PATENT DOCUMENTS

| | | | | |
|---|---|---|---|---|
| 2010/0147548 | A1* | 6/2010 | Bhandari | H01B 13/14<br>174/110 SR |
| 2015/0361245 | A1 | 12/2015 | Brockschmidt | C08K 3/34 |
| 2016/0189826 | A1 | 6/2016 | Fukuda et al. | 174/117 R |
| 2017/0306162 | A1* | 10/2017 | Yang | C08G 73/1003 |
| 2018/0051173 | A1 | 2/2018 | Sheth et al. | |

FOREIGN PATENT DOCUMENTS

| | | | |
|---|---|---|---|
| CN | 105518807 A | 4/2016 | H01B 13/00 |
| EP | 0 699 336 | 3/1996 | H01B 3/46 |
| EP | 2 763 142 | 8/2014 | H01B 3/40 |
| HK | 2017 037584 | 3/2017 | H01B 7/295 |
| WO | 2020 095268 | 5/2020 | C08H 73/10 |

OTHER PUBLICATIONS

Mylar_DuPont Tejin Films_pp. 1-2_Jun. 2003.*
Search Report for International Application No. PCT/EP2022/053682, 10 pages.
Search Report for EP Application No. 21158485.9, 6 pages.
Chinese Office Action, Application No. 202280016421.6, 7 pages, Mar. 3, 2025.
CN 1123582 A, U.S. Pat. No. 5,660,932 A.
CN 105518807 A, US 2016/0189826 A1.

* cited by examiner

INSULATING SYSTEM COMPRISING A SOLID INSULATING MATERIAL AND IMPREGNATING RESIN

CROSS-REFERENCE TO RELATED APPLICATIONS

This application is a U.S. National Stage Application of International Application No. PCT/EP2022/053682 filed Feb. 15, 2022, which designates the United States of America, and claims priority to EP Application No. EP 21158485.9 filed Feb. 22, 2021, the contents of which are hereby incorporated by reference in their entirety.

TECHNICAL FIELD

The present disclosure relates generally to the field of electrical machines. Various embodiments include insulation of electrical conductors against partial discharge in the mid- and high-voltage range, insulation systems for an electrical machine, e.g. a rotating electrical machine such as an electric motor and/or a generator.

BACKGROUND

Electrical machines, for example motors and generators in the mid- and high-voltage range, have electrical conductors, a main insulation and a laminated stator core. The main insulation serves the purpose of electrically insulating the conductors from one another, from the laminated stator core and from the environment. On operation of the electrical machine, electrical partial discharges can result in formation of "treeing" channels in the main insulation. The treeing channels can result in electrical flashover through the main insulation. In the low-voltage range, where wires and cables are used, there will not necessarily be electrical discharges in operation, and so no barrier against partial discharges is required in that case.

The "mid- and high-voltage range" in the present context refers to high-voltage electrical engineering in the region above 700 V up to and including 52 kV. This means that the insulation systems of interest for fast-charging drive systems in the automotive industry are also included.

A barrier in the form of a two-dimensional insulation material against partial discharges has to date been achieved mainly through the use of mica in the main insulation, which has high partial discharge resistance. The mica is processed in the form of platelet-shaped mica particles having a conventional particle size of several hundreds of micrometers up to several millimeters to give a mica paper, which is subsequently placed on a carrier, such as a glass fiber weave and/or insulation film, and bonded, such that the mica particles give rise to the two-dimensional insulant in the form of a broad mica web. A mica tape is cut from this broad mica web, and this is wound around the conductor to produce the main insulation. Subsequently, the insulation system is produced by impregnating the mica wrapping tape for electrical insulation with a liquid synthetic resin and then curing the synthetic resin.

There are known insulation systems—for example the system known by the "Micalastic®" brand—in which the main insulation, comprising a mica wrapping tape as two-dimensional insulant, is impregnated with a bisphenol epoxy resin in a vacuum pressure impregnation method. Micalastic® is also known from EP2763142A1 and DE 102011083228A.

One known way of improving the partial discharge resistance of the main insulation is the use of nanoscale particles that are dispersed in the synthetic resin prior to the impregnation. However, the presence of the particles shortens the pot life of the synthetic resin, which is manifested particularly in progressive polymerization of the synthetic resin prior to the impregnation.

The production of the two-dimensional insulation material as groove lining and/or in the form of a broad mica web and/or of a mica tape is inconvenient and costly.

In particular, another area in which mica-containing laminates comprising m-aramid and polyimide as carrier material, for example, have been used to date is that of groove linings for traction motors, because of the demands. In order to gain maximum performance from the machine, it is operated at the highest possible current densities, but this also gives rise to significant losses in the form of heat. Traction motors are operated at comparatively high temperatures, especially also at temperatures above 150° C.

DE 10 2020 208760 describes a two-dimensional insulation material composed of a copolymer of a polyetherimide with a siloxane, but this exhibits a softening point at elevated temperature as exists in traction motors, for example. One reason for this is that, because of the less polar side groups of the siloxane in the copolymer of polyetherimide and siloxane, these act as an "impurity" with respect to the pure polyetherimide, which lowers the glass transition temperature. These polyetherimide-siloxane copolymers can be produced by suitable extrusion methods in two-dimensional form as a film, and these in turn have sufficient elasticity in order to be used as wrapping tapes in ready-cut form, but these wrapping tapes are not usable as wrapping tapes in the operating temperature range above 150° C., especially above 170° C.

SUMMARY

Teachings of the present disclosure include a two-dimensional insulant having a softening temperature and/or melting point at least above 150° C., or higher, and/or having a temperature index of 180° C. or—if possible—even higher. For example, some embodiments include an insulation system comprising a solid insulation material in the form of a two-dimensional insulant and a synthetic resin, wherein the two-dimensional insulant is a blend of at least one copolymer, especially a copolymer of a polyetherimide with a siloxane, with at least one high-temperature thermoplastic, and the synthetic resin is a thermoset with which the two-dimensional insulant is impregnated and then cured.

In some embodiments, a copolymer of polyetherimide and siloxane is a block copolymer.

In some embodiments, the copolymer has a proportion of siloxane in the range from 0.1% by weight to 90% by weight, based on the total weight of the copolymer.

In some embodiments, there is an atomic proportion of silicon atoms in the copolymer within a range from 1% to 25%, based on all atoms in the copolymer.

In some embodiments, the copolymer is of the formula (I)

(I)

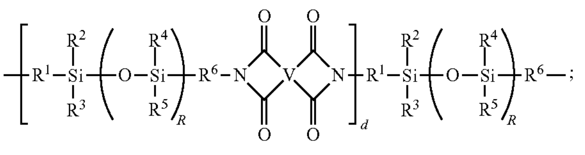

Where $R^{1-6}$ are the same or different and are selected from the group of the
- substituted or unsubstituted, saturated, unsaturated or aromatic monocycles having 5 to 30 carbon atoms,
- substituted or unsubstituted, saturated, unsaturated or aromatic polycycles having 5 to 30 carbon atoms,
- substituted or unsubstituted, saturated hydrocarbons having 1 to 30 carbon atoms,
- substituted or unsubstituted, unsaturated hydrocarbons having 2 to 30 carbon atoms;

V is a tetravalent linker group selected from the group of the
- substituted or unsubstituted, saturated, unsaturated or aromatic monocycles and polycycles having 5 to 50 carbon atoms,
- substituted or unsubstituted, saturated hydrocarbons having 1 to 30 carbon atoms,
- substituted or unsubstituted, unsaturated hydrocarbons having 2 to 30 carbon atoms,
- and any combination of linker groups that comprise at least one of the aforementioned groups;

G is 1 to 30 and

D is 2 to 20.

In some embodiments, at least one high-temperature thermoplastic in the blend is semicrystalline.

In some embodiments, at least one high-temperature thermoplastic is selected from the group of the following thermoplastics: polyamideimide -PAI-, polysulfone -PSU-, polyphenylene-sulfone -PPSU-, poly(oxy-1,4-phenylsulfonyl-1,4-phenyl) -PESU-, polyphenylenesulfide -PPS-, polyether-sulfone -PES-, polyaryletherketone -PAEK-, polyetheretherketone -PEEK-, polyaryletherketone -PAEK-, polyphenyleneether -PPE-, polyoxymethylene -POM-, perfluoroalkoxy polymer -PFA-, polyvinylidenefluoride PVDF, polyetherketone -PEK-, polyetherketoneketone PEKK, polytetrafluoroethylene -PTFE-, polybenzimidazole -PBI- and/or polyetherimide -PEI-.

In some embodiments, one or more oxidation-inhibiting additive(s) are provided in the two-dimensional insulant.

In some embodiments, the copolymer used is the product available under the Siltem™ trade name.

In some embodiments, the insulation system comprises a two-dimensional insulant composed of a blend of a polyetherimide-siloxane copolymer with a high-temperature thermoplastic at least in the form of a laminate, or of a film, in the form of a tape and/or of a tape cut from a laminate.

Some embodiments include use of a polyetherimide-siloxane copolymer as two-dimensional insulant and/or as wrapping tape for an insulation system in the mid- and high-voltage range.

Some embodiments include use of a blend of a polyetherimide-siloxane copolymer with a high-temperature thermoplastic as two-dimensional insulant and/or as wrapping tape in electrical traction motors or generators of steam turbines and/or gas turbines.

Some embodiments include use of a blend of a polyetherimide-siloxane copolymer with a high-temperature thermoplastic as two-dimensional insulant and/or as wrapping tape in wind generators.

Some embodiments include use of a blend of a polyetherimide-siloxane copolymer with a high-temperature thermoplastic as two-dimensional insulant and/or as wrapping tape in electrical drive motors.

Some embodiments include use of a blend of a polyetherimide-siloxane copolymer with a high-temperature thermoplastic as two-dimensional insulant in the form of a film and/or laminate as groove lining and/or as wrapping tape in an electrical rotating machine, a motor and/or a generator.

DETAILED DESCRIPTION

Figure 1:
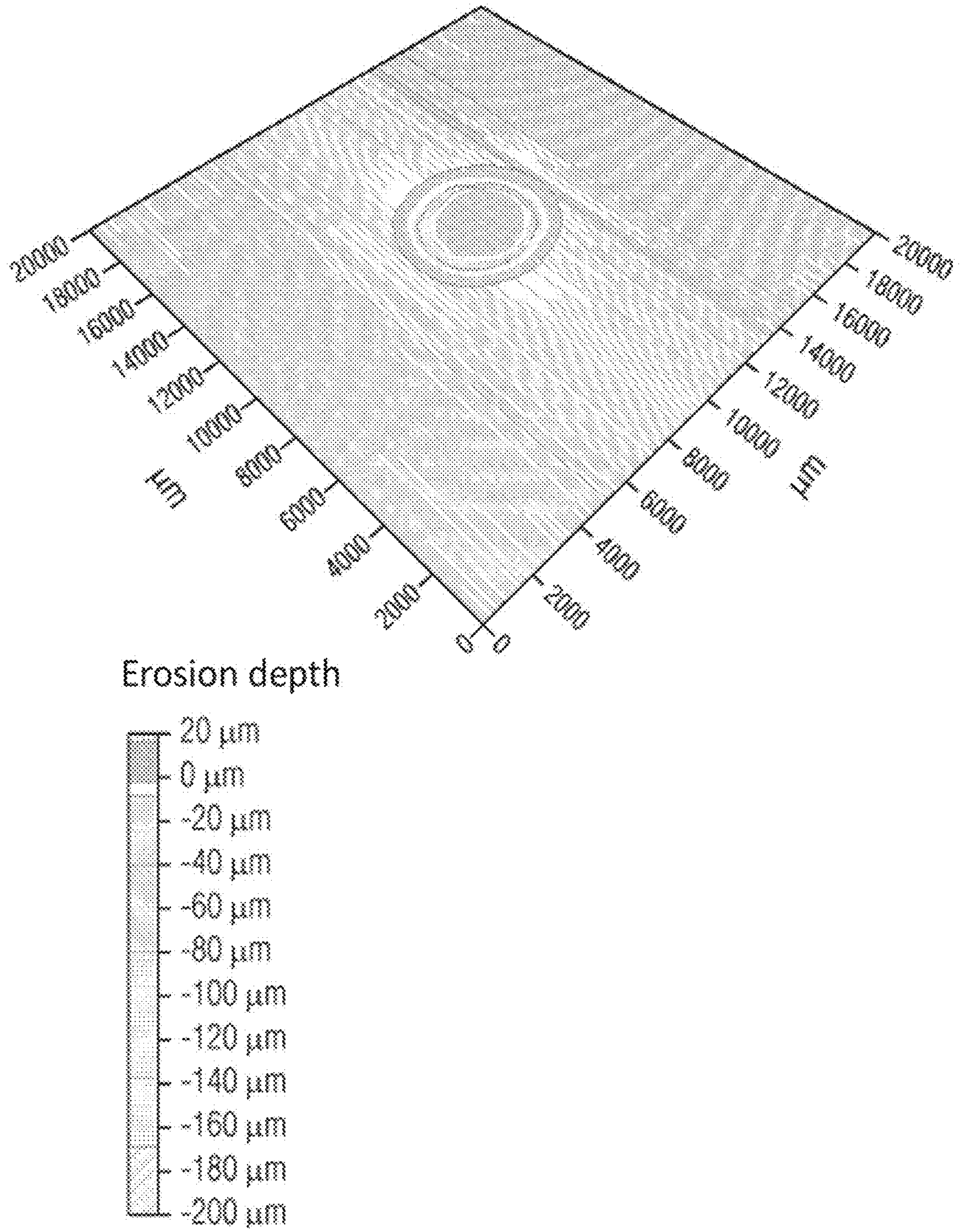
FIGS. 1 and 2 show the surface of two test specimens with insulation systems, in each case a solid two-dimensional insulant impregnated with a synthetic resin that has been cured after impregnation.

The teachings of the present disclosure include insulation systems. For example, some embodiments include a solid insulation material in the form of a two-dimensional insulant and a synthetic resin, wherein the two-dimensional insulant is in the form of a film and is a blend of a copolymer of a polyetherimide with a siloxane with a high-temperature thermoplastic, for example polyimide, and the synthetic resin is a thermoset with which the two-dimensional insulant is impregnated and then cured.

A mixture of a copolymer, especially a siloxane-polyetherimide copolymer in a blend with a high-temperature thermoplastic—for example even with one of the coreactants of the copolymer as a blend partner—gives rise to a stable mixture suitable for film production. Blend partners used for the copolymer are high-temperature thermoplastics, for example polyetheretherketone (PEEK), polyaryletherketone (PAEK), polyphenyleneether (PPE), polyoxymethylene (POM), perfluoroalkoxy polymer (PFA), polyvinylidenefluoride PVDF, polyetherketone PEK, polyetherketoneketone PEKK, polytetrafluoroethylene PTFE, polyphenylenesulfone PPSU, polyethersulfone PES, polysulfone PSU, poly(oxy-1,4-phenylsulfonyl-1,4-phenyl) PESU, polyamideimide PAI, polybenzimidazole PBI and/or polyetherimide PEI. The use of PEI has been found to be particularly advantageous because this can virtually completely suppress separation of the blend in film production. Moreover, the use of polysulfones as blend partner has been found to be suitable for a copolymer of polyetherimide and siloxane because film production by extrusion without significant separation is possible here too.

Further high-temperature thermoplastics are: other polyimide(s), polyamideimide -PAI-, polyetherketone -PEK-, polyetheretherketone -PEEK-, polyetherketoneketone -PEKK-, polysulfone -PSU- and/or -PPSU-, polyphenylenesulfide -PPS-, polyethersulfone -PES-, poly(oxy-1,4-phenylsulfonyl-1,4-phenyl) -PESU-, polyaryletherketone -PAEK-.

All the high-temperature thermoplastics mentioned may be used as they are and/or in any combinations and mixtures.

In some embodiments, the high-temperature thermoplastics preferably contain an aromatic base structure. This means that these compounds are stable firstly against oxidation, and secondly against free radical formation. Both are very important, particularly in view of the requirement for partial discharge resistance. In particular, chain stiffness is also greater in aromatic polymers, and so the glass transition temperature is higher.

In some embodiments, a high-temperature thermoplastic as blend partner may be in semicrystalline, crystalline and/or amorphous form—i.e. including as a mixture of these modifications. Preference is given here to the semicrystalline or crystalline high-temperature thermoplastics as blend partners because they show particular stability against oxidation, partial discharges and/or free radical formation.

A polyetherimide-siloxane copolymer in particular has been found to be a copolymer of enormous potential as insulation material in the mid- and high-voltage range with regard to stability to thermal stresses and also to partial discharges. The softening temperature of the copolymer alone as two-dimensional insulation material is only slightly above 170° C., such that it is usable as two-dimensional insulation material in an insulation system at relatively high operating temperatures, especially also at operating temperatures above 180° C.

In some embodiments, a blend of the copolymer with a high-temperature thermoplastic in an amount of 1% to 90% by weight, for example, gives rise to a two-dimensional insulation material which is processible as a film because it does not show any separation problems and is usable within a temperature range—meaning an operating temperature of the electrical machine—of, for example, 170° C. up to 250° C.

In some embodiments, drive motors and traction motors are electrical rotating machines that are operated at high temperatures, i.e. temperatures above 155° C.

Polymers that are mixtures with high-temperature thermoplastics are known, but these are often mixtures of polymers that separate again in the production of the film, e.g. in the film drawing operation. Therefore, when a blend partner is added, it is necessary to take note of the reactivity of the side groups, and it has been found that the polar side groups of the copolymer, combined with a thermoplastic having likewise polar side groups, may show advantages, especially in the production of two-dimensional insulation materials in the form of films. Thus, preference is given to using polysulfones such as polyphenylene-sulfones and polyethersulfones as blend partners for a copolymer of polyetherimide and siloxane.

The production of a film from the blend of a thermoplastic with a copolymer, for example a copolymer formed from a polyetherimide and siloxane, and the use of the film as two-dimensional insulation material to replace mica-containing materials, is possible since the enormous potential of the two-dimensional insulation material with regard to stability to thermal stress has been recognized and demonstrated.

Partial discharge resistance is assessed via surface profilometers by ascertaining the specific erosion volume after electrical aging. This is conducted in accordance with IEC 60343. The experimental setup and test conditions can in the publication:N. Müller; S. Lang; R. Moos: “Influence of ambient conditions on electrical partial discharge resistance of epoxy anhydride based polymers using IEC 60343 method”. Transactions on Dielectrics and Electrical Insulation 2019.

In some embodiments, the polyetherimide-siloxane copolymer is a block copolymer. In some embodiments, the proportion of siloxane in the copolymer is in the range from 0.1% by weight to 90% by weight, 10% by weight to 60% by weight or 20% by weight to 40% by weight, based on the total weight of the copolymer.

In some embodiments, the atomic proportion of silicon atoms in the copolymer is 0% to 30% atom percent, from 0% to 25%, or from 0% to 15%.

In some embodiments, the polyetherimide-siloxane copolymer is a block copolymer of the general formula (I)

(I)

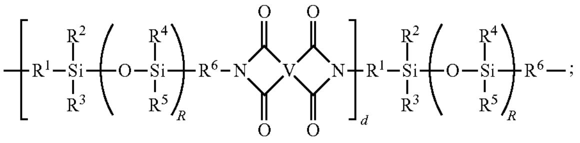

where $R^{1-6}$ are the same or different and are selected from the group of the
- substituted or unsubstituted, saturated, unsaturated or aromatic monocycles having 5 to 30 carbon atoms,
- substituted or unsubstituted, saturated, unsaturated or aromatic polycycles having 5 to 30 carbon atoms,
- substituted or unsubstituted, saturated hydrocarbons having 1 to 30 carbon atoms,
- substituted or unsubstituted, unsaturated hydrocarbons having 2 to 30 carbon atoms;

V is a tetravalent linker group selected from the group of the
- substituted or unsubstituted, saturated, unsaturated or aromatic monocycles and polycycles having 5 to 50 carbon atoms,
- substituted or unsubstituted, saturated hydrocarbons having 1 to 30 carbon atoms,
- substituted or unsubstituted, unsaturated hydrocarbons having 2 to 30 carbon atoms,
- and any combination of linker groups that comprise at least one of the aforementioned groups;

g is 1 to 30 and d is 2 to 20.

In some embodiments, one or more additives may be present in the copolymer. For example, one or more metal oxide(s), for example $TiO_2$ and/or those with one of the following empirical formulae: $Na_8Al_6Si_6O_{24}S_4$ and/or $Na_6Al_6Si_6O_{24}S_2$. Further additives may be $Fe_2O_3$ and/or $MnFe_2O_4$ and/or electrically nonconductive carbon-based fillers, for example industrial carbon black, as additives. If required, the additive particles may be provided partly or wholly with an $SiO_2$ coating, over the full surface or part of the surface.

These additives are especially also oxidation-inhibiting, and so the heat class or temperature index of a two-dimensional insulation material produced therewith can be increased further. Additives are added, for example, in the production of the blend. Further additives, leveling aids, color pigments, quartz particles and others may be added to the blend and/or the impregnation agent for production of the insulation system.

“Siloxane” in the present context refers in principle to a compound having at least one —Si—O—Si— unit, especially those that form a Si—O—Si backbone in the polymer as is customary in silicones. For example, a polydialkylsiloxane, such as polydimethylsiloxane, or a polydiarylsiloxane, such as polydiphenylsiloxane, are simple forms of a siloxane. There are of course also mixed forms of siloxanes, for example a polyarylalkylsiloxane.

Polyetherimide or “PEI” refers to the known thermoplastic, which has various uses because it is stable to high temperature and classified as flame-retardant. This is especially because it shows low evolution of smoke if it nevertheless burns. PEI has high strength, including high electrical flashover resistance, and low weight, and is resistant to UV light and gamma rays. In particular, PEI is commercially available as "ULTEM®".

In some embodiments, the polyetherimide is used firstly for formation of the copolymer with siloxane; in other words, the monomers of the polyetherimide and the monomers of the siloxane are cured together to form a polymer.

In some embodiments, irrespective of the copolymer used, the polyetherimide is used as high-temperature thermoplastic for blending of the copolymer to form the blend in one embodiment of the invention.

In some embodiments, the blend or else polyblend is formed by simply mixing the two components: copolymer on the one hand and high-temperature thermoplastic on the other. The properties of the blend, especially with regard to thermal stability, do not correspond to those of the copolymer or to those of the high-temperature thermoplastic. A blend in this sense is a purely physical mixture; no new chemical bonds are formed between the macromolecules.

The impregnation resin used to form the synthetic resin of the insulation system and to impregnate the wrapping tape insulation and/or the slot cell composed of a two-dimensional insulation material according to the invention is a thermoset. It is possible here to use, for example, polyester, formaldehyde, epoxide, novolak, silicone, polyesterimide, polyurethane, and any mixtures, blends and copolymers of the aforementioned compounds.

Impregnation resins for groove linings and/or wrapping tape insulations are common knowledge, from the above-cited patent specifications among others. The solid insulants are impregnated with these impregnation resins, and then the resin is cured in order to complete the insulation system.

Fillers may be added both to the impregnation resin and to the blend of a copolymer with a high-temperature thermoplastic. Silicon dioxide nanoparticles also have been found to be useful here, especially in order to increase the silicon content, and these further increase the partial discharge resistance of the insulation system.

Under the "Siltem™" trade name, a polyetherimide-siloxane copolymer is available, which has already been mixed here successfully with thermoplastics to form a blend, and then used and tested. Siltem is an amorphous thermoplastic polyetherimide-siloxane copolymer, and combines the thermal stability of PEI with the flexibility of a silicone elastomer. As a blend with a high-temperature thermoplastic, especially with a semicrystalline high-temperature thermoplastic, it shows good processibility to give a film, for example by a conventional extrusion method.

Figure 2:
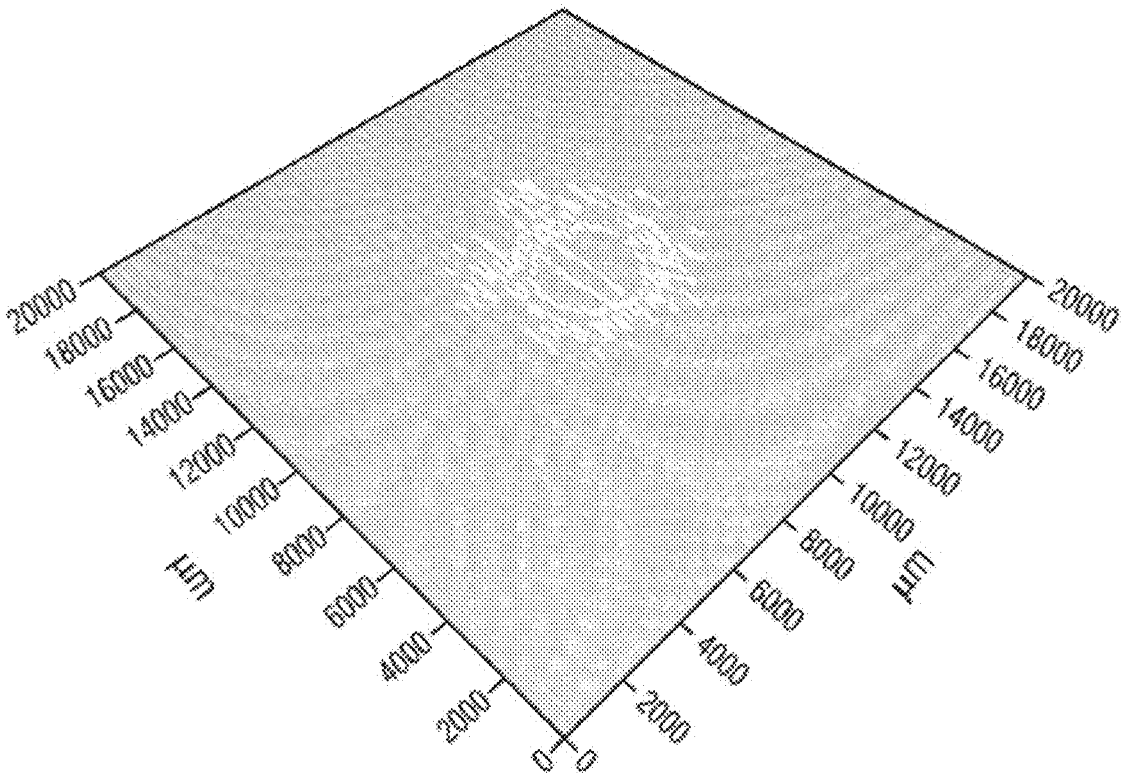

FIGS. 1 and 2 show the surface of two test specimens with insulation systems, in each case a solid two-dimensional insulant impregnated with a synthetic resin that has been cured after impregnation. Both figures show the test specimen after electrical aging. FIG. 1 shows the erosion of the insulation system produced with pure polyetherimide, and FIG. 2 the erosion of the insulation system produced under the same conditions as solid two-dimensional insulant in one embodiment of the invention—from a blend of a polyetherimide-siloxane copolymer with a thermoplastic.

The defined standard test conditions for electrical aging according to IEC 60343 are:

Voltage: 10 kV

Atmosphere: air, 50% RH

Temperature: room temperature, about 23° C.

Test duration: 100 hours

Flow rate: 1000 $l*h^{-1}$

Beneath FIG. 1 is the legend, and it is apparent that, in FIG. 1, the insulation system with pure PEI, a circle is formed under the conditions mentioned below around the conductor disposed in the middle with an erosion depth of up to 80 μm caused by partial discharges, whereas, under the same conditions, the test specimen of FIG. 2, with the insulation system produced identically apart from the solid insulation material, which comprises the copolymer of the invention as solid insulation material, in the case tested the commercial product Siltem® and/or Ultem® STM 1600 as PEI-siloxane copolymer, also shows circular aging, but only with an erosion depth between −1 μm and −8 μm.

According to these tests, embodiments of the present disclosure brings a quantum leap in insulation technology, since it is possible here for the first time to dispense with mica-containing insulation material which is costly and difficult to produce. The blend of a copolymer with a high-temperature thermoplastic brings about an enormous rise, and indeed virtually complete partial discharge resistance, with respect to pure polyetherimide.

Because of the partial discharge resistance found and the capability of the blend of being processed as a film, the copolymer-thermoplastic blend presented here as a mica substitute is suitable as a two-dimensional insulant, both for wrapping tape insulations and for two-dimensional insulations, for example groove lining insulations, particularly in the use of motors, both for traction and as drive motor, but also for generators, for example a wind power generator. By virtue of its excellent elongation properties, it extends the design spectrum of traction motors, for example.

It is thus an achievable aim to produce both the m-aramid-containing groove linings and likewise the polyimide-containing insulation tapes with the two-dimensional insulant of the invention composed of polyetherimide-siloxane copolymer without having to compromise in terms of the power density of the motors or generators. In particular, it is possible in both insulation systems to replace the mica paper and/or mica tape, in each case at least comprising mica on a carrier, for example glass weave, and a tape adhesive for bonding of the mica platelets, with the polyetherimide-siloxane copolymer that can be processed by two-dimensional extrusion among other methods.

A film produced by two-dimensional extrusion, for example, in one embodiment of the invention insulates the coils and/or wires of the winding of an electric motor, for example. These coils are then inserted into the grooves of a laminated stack and then impregnated with an impregnation resin, for example a polyesterimide and/or a silicone.

An example insulation system comprises, for example, laminate with one or more films of polyetherimide-siloxane copolymer, for example including in processed form to give laminates with carriers and/or protective films, for example combined with m-aramid or polyimide as carrier material.

A "film" in the present context is understood to mean a two-dimensional layer of a material. The film is a layer and not a layer stack. The wall thickness of a film is typically between 1 μm and 0.7 mm, for example between 2 μm and 0.5 mm.

A "laminate", by contrast, is generally a layer stack comprising one or more films or papers. It is possible here for the layers to lie one on top of another over the full area—e.g. all layers of films—or over part of the area, e.g. at least one layer with, for example, a grid and/or randomly distributed fibers and/or mesh structure. It may also be sufficient for laminate formation for a film to be bonded to a weave or laid scrim, for example a glass fiber scrim.

A "laminate" in the present disclosure means a stack and/or a composite of at least two layers or films, i.e., for example, at least one carrier film and/or protective film and/or paper, for example of m-aramid or polyimide, with at least one film of the thermoplastic copolymer blend.

Especially in the case of groove linings as occur, for example, in electric motors, wind generators, etc., the simple films of copolymer thermoplastic blend as two-dimensional insulant can tear; therefore, it is better here to use laminates with comparatively tear-resistant films or papers for the use of the blend of thermoplastic and copolymer as insulation.

In some embodiments, the laminates are, for example, cut to tapes and used in insulation systems. Thus, an insulation of a groove for an electric motor, over its entire length, can also and/or additionally be protected as groove lining by means of a two-dimensional insulant composed of polyetherimide-siloxane copolymer/high-temperature thermoplastic blend in high film thickness and/or processed as a laminate, i.e., for example, in a composite with, for example, m-aramid papers and/or polyimide films.

The thickness of a two-dimensional insulation material composed of a film in the form of a tape is, for example, in the range from 1 μm to 250 μm, between 20 μm and 220 μm, or in the range between 25 μm and 200 μm.

The thickness of a two-dimensional insulation material composed of a film in the form of a groove lining is, for example, in the range from 70 μm to 500 μm, between 90 μm and 300 μm, or in the range between 100 μm and 450 μm.

In order to produce the insulation system, the winding composed of the film, optionally in the form of a laminate, is inserted into the grooves and, in turn, the entire winding is impregnated with an impregnation resin composed of a thermoset, which may be in filled or unfilled and electrically insulating or electrically conductive form—for example in the case of production of a corona shielding system such as outer corona shield.

Particular benefits of the use of a high-temperature thermoplastic copolymer blend in film form as two-dimensional insulant may include, for example, that

- the entire insulation system can be produced much less expensively than mica-based two-dimensional insulant,
- the two-dimensional insulant is thermally durable to about 170° C. to 250° C.—depending on the blend with high-temperature thermoplastics,
- the blend is also flexible due to a siloxane content in the copolymer, and so it is usable as wrapping tape,
- the blend electrically—as shown by tests—withstands the field strength required in a sustained manner, since the electrical discharges that occur at electrical field strengths up to a maximum of 15 kV/ram (!), when they meet a siloxane or an $SiO_2$ nanoparticle, form a vitrified protective layer that significantly increases the lifetime of an electrical rotating machine insulated therewith. The vitrified layer thus formed can be efficiently detected by SEM; moreover, elemental analysis by EDX is possible in order to detect the silicon in the copolymer, for example, and
- the blend is resistant to partial discharge, as shown by FIG. 2 of the present description, which leads to a distinct increase in the electrical lifetime of the insulation system.

The teachings herein for the first time provide for replacement of the mica conventionally used as barrier material in an insulation system such as the main insulation of electrically rotating machines such as motors and/or generators. The replacement is based on a blend of a copolymer, especially a polyetherimide-siloxane copolymer, with a high-temperature thermoplastic which is processible in two-dimensional form, for example via two-dimensional extrusion. This produces films that are usable in insulation systems as wrapping tape insulations and/or as useful linings, having been processed in film form or else as laminate, and cut in the form of two-dimensional insulants or of tapes.

What is claimed is:

1. An insulation system comprising:
   - a solid insulation material including a two-dimensional insulant and a synthetic resin; wherein the two-dimensional insulant includes a blend of a copolymer with a high-temperature thermoplastic; and
   - the synthetic resin includes a thermoset to impregnate the two-dimensional insulant and then cure the two-dimensional insulant; and
   - the synthetic resin includes at least one semicrystalline high-temperature thermoplastic; and
   - wherein the two-dimensional insulant for the insulation system is in a voltage range above 700 V up to and including 52 kV.

2. The insulation system as claimed in claim 1, wherein the copolymer includes polyetherimide and siloxane in a block copolymer.

3. The insulation system as claimed in claim 1, wherein the copolymer has a proportion of siloxane in the range from 0.1% by weight to 90% by weight, based on the total weight of the copolymer.

4. The insulation system as claimed in claim 1, wherein an atomic proportion of silicon atoms in the copolymer is within a range from 1% to 25%, based a total number of atoms in the copolymer.

5. The insulation system as claimed in claim 1, wherein the copolymer has the formula (I)
   - Where R1-6 are the same or different and are selected from the group of the
     - substituted or unsubstituted, saturated, unsaturated or aromatic monocycles having 5 to 30 carbon atoms,
     - substituted or unsubstituted, saturated, unsaturated or aromatic polycycles having 5 to 30 carbon atoms,
     - substituted or unsubstituted, saturated hydrocarbons having 1 to 30 carbon atoms,
     - substituted or unsubstituted, unsaturated hydrocarbons having 2 to 30 carbon atoms;
   - V is a tetravalent linker group selected from the group of the
     - substituted or unsubstituted, saturated, unsaturated or aromatic monocycles and polycycles having 5 to 50 carbon atoms,
     - substituted or unsubstituted, saturated hydrocarbons having 1 to 30 carbon atoms,
     - substituted or unsubstituted, unsaturated hydrocarbons having 2 to 30 carbon atoms,
     - and any combination of linker groups that comprise at least one of the aforementioned groups;
   - G is 1 to 30 and
   - D is 2 to 20.

6. The insulation system as claimed in claim 1, wherein the synthetic resin includes at least one high-temperature thermoplastic selected from the group of the following thermoplastics: polysulfone-PSU-, polyphenylenesulfide-PPS-, polyaryletherketone-PAEK-, polyetheretherketone-PEEK-, polyaryletherketone-PAEK-, polyoxymethylene-POM-, perfluoroalkoxy polymer-PFA-, polyvinylidenefluoride PVDF, polyetherketone-PEK-, polyetherketoneketone PEKK, polytetrafluoroethylene-PTFE-, polybenzimidazole-PBI-and/or PEI-Si copolymer.

7. The insulation system as claimed in claim 1, wherein the two-dimensional insulant includes one or more oxidation-inhibiting additives.

8. The insulation system as claimed in claim 1, wherein the copolymer comprises an amorphous thermoplastic polyetherimide-siloxane copolymer.

9. The insulation system as claimed in claim 1, wherein the two-dimensional insulant comprises a blend of a polyetherimide-siloxane copolymer with a high-temperature thermoplastic in the form of a laminate, or of a film, in the form of a tape and/or of a tape cut from a laminate.

10. A method comprising using a polyetherimide-siloxane copolymer as two-dimensional insulant and/or as wrapping tape for an insulation system in a voltage range above 700 V up to and including 52 kV;

wherein the synthetic resin includes at least one semicrystalline high-temperature thermoplastic.

* * * * *